United States Patent Office 3,226,921
Patented Jan. 4, 1966

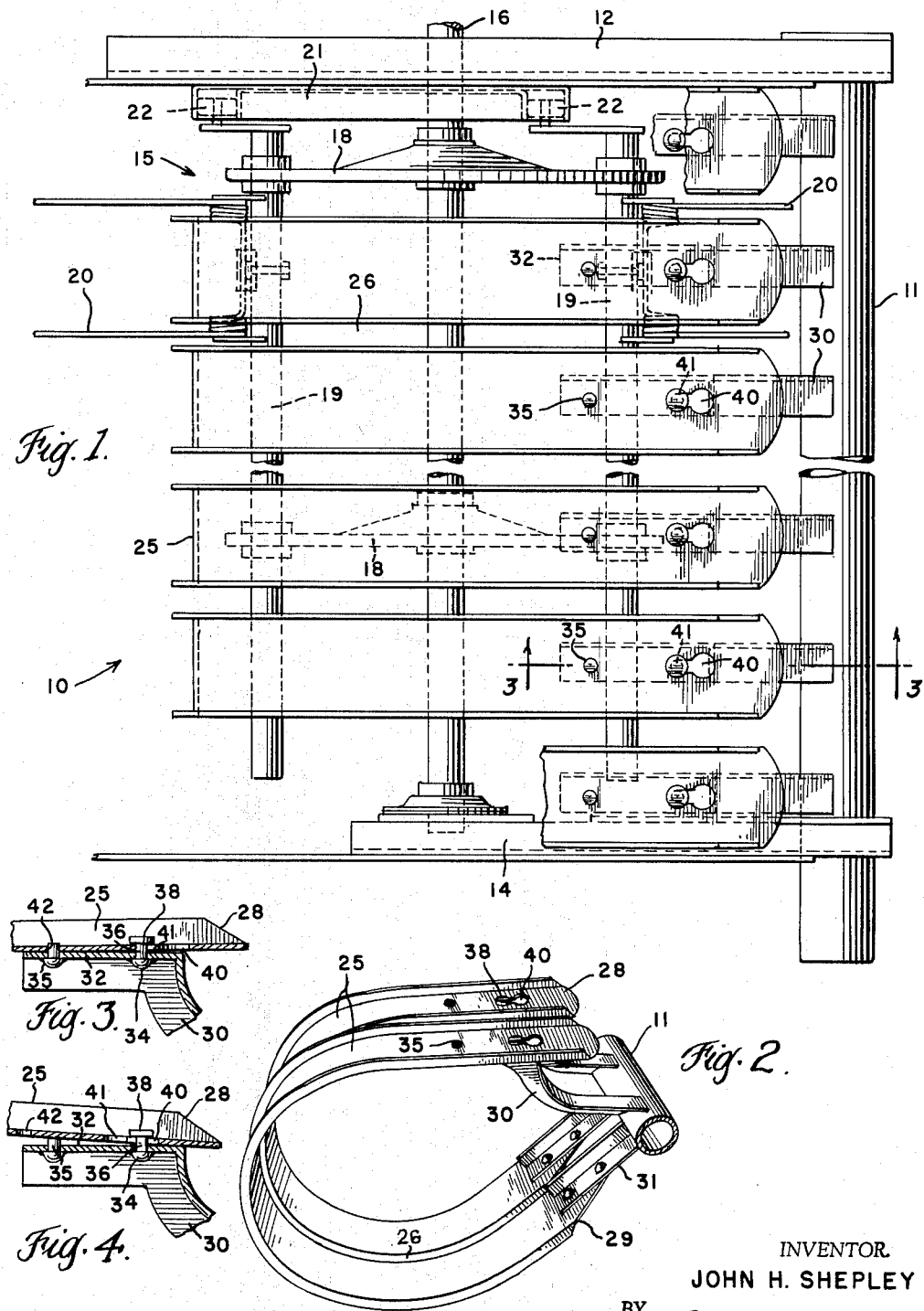

3,226,921
QUICK DETACHABLE MEANS FOR A PICK-UP REEL STRIPPER BAR
John H. Shepley, Lancaster, Pa., assignor to Sperry Rand Corporation, New Holland, Pa., a corporation of Delaware
Filed Feb. 27, 1964, Ser. No. 347,852
3 Claims. (Cl. 56—364)

This invention relates generally to crop pick-ups for hay balers, forage harvesters and other farm implements. More particularly, the invention relates to an improved means for mounting stripper members on a pick-up.

In a crop pick-up, a reel rotates on a horizontal transverse axis and is provided with radially extending axially spaced fingers or tines to sweep crop material from the ground and deposit it in an elevated location. The fingers travel between laterally spaced U-shaped stripper members surrounding the reel. These members support the material as it is elevated and remove the material from the fingers at a proper location.

Conventionally, the stripper members of a pick-up are fixedly attached to a frame structure by self tapping screws, bolts or other threaded means. If the pick-up has to be repaired, access to the reel is often necessary, in which case one or more of the stripper members may have to be removed. In many pieces of equipment, this is difficult because the fasteners which hold the strippers are not readily accessible. This usually results from the fact that the pick-up is assembled as a separate unit when manufactured and later attached to a base machine. Accessibility to the stripper fasteners is lost when the pick-up is installed on the machine.

Heretofore, it has been suggested to use stripper members on a pick-up which can be snapped on and off, the fastening connection being of a detachable variety rather than by threaded members. One major problem with detachable connections is to be sure that the stripper members do not inadvertently fall off. When operating in a field, a pick-up encounters a wide variety of conditions and forces from various directions. The crop coming against the pick-up may cause a given stripper member to become disconnected. Further, it is important to hold each stripper member in a desired operating location when the pick-up is operating so that the member will not interfere with the pick-up fingers on the rotating reel. Lateral shifting of the stripper members might foul the reel and produce substantial damage to the structure.

A main object of this invention is to provide a crop pick-up having stripper members which are detachably mounted on a frame structure by improved means for quick manual connection or detachment, but held securely in place when in use.

Another object of this invention is to provide a detachable crop pick-up stripper connection of such design that movement of each stripper member in the direction of its extension is prevented.

Another object of this invention is to provide a pick-up stripper connection of the character described which prevents lateral movement of a stripper member.

A further object of this invention is to provide a pick-up structure having stripper member connection means which is simply designed and of low cost whereby the overall cost of the pick-up assembly is not significantly increased.

Other objects of this invention will be apparent hereinafter from the specification and from the recital in the appended claims.

In the drawing:

FIG. 1 is a fragmentary plan view of a crop pick-up having stripper members mounted according to this invention;

FIG. 2 is a perspective view on a smaller scale showing two of the stripper members and the normal positions which they have around the reel;

FIG. 3 is a vertical section taken on the line 3—3 of FIG. 1 looking in the direction of the arrows and with a stripper member in attached position; and FIG. 4 is a view similar to FIG. 3 but showing the stripper member shifted to unlatching position.

Referring now to the drawing by numerals of reference, and particularly to FIG. 1, 10 denotes generally a crop pick-up having a support frame including a transverse pipe 11 from which a pair of supports 12 and 14 project. Supports 12 and 14 extend parallel to each other and they are spaced to provide rotatable support for a reel 15. The reel includes a rotatable shaft 16 driven from a source of power not shown. Shaft 16 is supported at one end of support 12 and at its opposite end on support 14. A plurality of axially spaced discs 18 are provided which carry rods 19 parallel to the axis of shaft 16. The rods 19 have fastened to them fingers or tines 20 which project radially outwardly and are axially spaced relative to each other. A cam track 21 is provided on support 12 and each rod 19 has a cam follower 22 operative in the cam track and controlling the angular position of its rod. Through this means, the angular projection of the tines is varied as the reels rotate. Such structure is conventional and merely provides the environment of the present invention.

Extending from frame support pipe 11 and surrounding reel 15 are generally U-shaped sheet metal, stripper members 25 which extend in planes transverse to the axis of the reel. The stripper members extend in side-by-side relation and are spaced from each other at 26 to provide spaces through which fingers 20 project. Each stripper member has an upper end 28 and a lower end 29 supported on the pipe 11. Pipe 11 has a bracket 30 for each stripper member upper end 28 and a bracket 31 for connection to the lower end 29 of each stripper. The connection to the pick-up frame provided at the upper end of each stripper may be the same as that provided at the lower end. Therefore, only the upper connection of one stripper will be described.

As shown best in FIGS. 3 and 4, each bracket 30 has a straight section 32 which fixedly carries a stud 34 and a pin 35, both of which project upwardly. Stud 34 has a cylindrical stem 36 and an enlarged head 38. The adjacent end 28 of stripper 25 has an opening 40 large enough that the head 38 of the stud can be projected through it. Opening 40 also has a slot 41 extending from it and toward pin 35. Each stripper 25 also has a hole 42 to receive pin 35.

To connect the upper end of a given stripper member 25 to the stud 34 and pin 35 of a particular bracket 30, the assembler positions the end 28 of the stripper as shown in FIG. 4 and projects the head 38 of stud 34 through opening 40. Then the stripper is shifted longitudinally to the right so that the stem 36 of the stud becomes lodged in slot 41. When so located, opening 42 comes into alignment with pin 35 and the parts will interlock. The sheet metal strippers have some resilience and may be easily manipulated from the position shown in FIG. 4 to the position shown in FIG. 3.

Each stud pin 34 provides means for detachably connecting a stripper member to support pipe 11 of the pick-up and each pin 35 locks its stripper member against movement in a direction transverse to the reel. Further, since each pin 35 is spaced from its associated stud 34 and since they are both in a common transverse plane, they cooperate to prevent pivoting or lateral shifting movement of the stripper member. Therefore, when crop material engages the pick-up, the stripper members may not move in the direction of their extension or be shifted laterally. Nevertheless, the strippers may be quickly and easily assembled or removed from the base structure. As will be apparent, the structure employed is simple and inexpensive. Therefore, the pick-up arrangement described can be manufactured at low cost.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A crop pick-up comprising a support frame, a reel mounted on said frame and rotatable on a given axis, radially extending axially spaced fingers on said reel and rotatable therewith, a plurality of crop strippers around said reel in spaced side by side relation and between which said fingers travel, each stripper being generally U-shaped and extending in a plane transverse to said reel axis, one end of each stripper being detachably connected to said frame by a stud and a pin on said frame, said stud and pin being spaced from each other in a common plane transverse to said reel, said stud having a stem and an enlarged head, the stripper one end having an opening to receive the head of said stud and having a hole spaced from the opening for said pin, said opening having a slot extending therefrom toward said hole, said slot being adapted to receive the stem of the stud and when the stem is in the slot the pin being projectable through said hole, said stud and pin cooperating to hold its stripper against lateral movement and against movement in the direction of extension of the stripper.

2. A crop pick-up comprising a support frame, a reel mounted on said frame and rotatable on a given axis, radially extending axially spaced fingers on said reel and rotatable therewith, a plurality of crop strippers around said reel and between which said fingers travel, each stripper being generally U-shaped and extending in a plane transverse to said reel axis, detachable means connecting one end of each stripper to said frame, and disengageable means spaced from said detachable means connecting another location of said one end of each stripper to said frame, said disengageable means being spaced from said detachable means in a direction transverse to said reel, both means cooperating to resist lateral movement of its stripper and to hold the stripper against movement in the direction of its extension, said detachable means comprising a stud on said frame for each stripper, each stud having a stem and an enlarged head projectable through an opening in its associated stripper and said opening having a communicating slot adapted to receive the stud stem.

3. A crop pick-up as recited in claim 2 wherein said disengageable means comprises a pin on said frame for each stripper and a hole in its associated stripper to receive the pin, each pin being projectable into its associated stripper hole when the associated stud stem is in the stripper slot.

References Cited by the Examiner

UNITED STATES PATENTS

| | | | |
|---|---|---|---|
| 1,877,519 | 9/1932 | MacGregor | 56—364 |
| 2,165,088 | 7/1939 | Anderson | 56—364 |
| 2,256,829 | 9/1941 | Hyman | 56—364 |

ABRAHAM G. STONE, *Primary Examiner.*

J. O. BOLT, *Assistant Examiner.*